INVENTORS.
Ernest Mullet
Waldo D. Rempel
BY
Attorney.

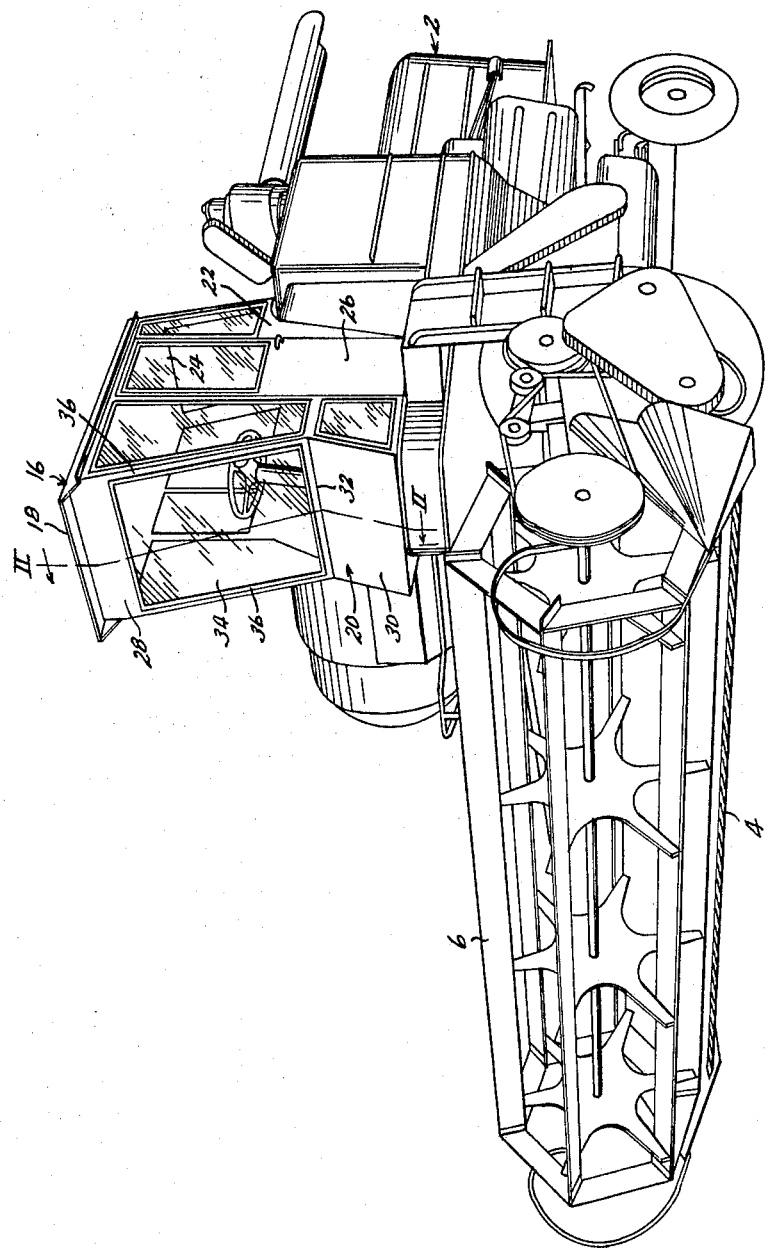

United States Patent Office 3,278,222
Patented Oct. 11, 1966

3,278,222
CAB ENCLOSURE FOR AGRICULTURAL
IMPLEMENTS
Ernest Mullet, Hesston, and Waldo D. Rempel, Newton, Kans., assignors to Excel Industries, Inc., Hesston, Kans., a corporation of Kansas
Filed June 8, 1964, Ser. No. 373,321
9 Claims. (Cl. 296—28)

This invention relates to new and useful improvements in cab enclosures for agricultural implements adapted to house the human operator for better health and comfort, and has particular reference to cab enclosures for agricultural implements wherein the operator's station is disposed above and behind the main operating parts of the machine which the operator must keep in view during use of the machine. The cab has been designed primarily for use with harvester combines, but may also be used in connection with cotton picker machines, in certain applications of farm tractors, and with other machines and implements.

The principal feature of the present invention is the provision of a cab enclosure having a new and novel front profile shape or configuration providing several advantages. Among these advantages are the provision of ample forward clearance at the head level of the operator in order that he may lean forward and look substantially straight down whenever efficient operation of the machine may require such vision; arrangement of the transparent window forming a part of the front wall of the cab so that it causes less distortion of the operator's vision, by placing it closer to the operator and more nearly at right angles to the operator's normally downward line of sight; arrangement of said window so that it is less likely to be obscured by dust or moisture, and less likely to direct reflected sunlight glare toward the operator's eyes; the provision of a greater horizontal angle of vision by movement of the side posts of the front wall rearwardly; and the provision of a lower opaque panel in said front wall whereby to shade the operator's feet and legs from direct sunlight, thereby providing greater comfort, said opaque panel being so arranged that despite its opacity, it does not appreciably obstruct or limit the operator's field of vision. Generally, these objects are accomplished by means of a front cab wall consisting of upper and lower panels joined along a horizontal line somewhat below the kneel level of the operator, said upper panel sloping upwardly and forwardly and consisting principally of a transparent glass pane, and said lower panel sloping downwardly and forwardly and being opaque.

Other objects are simplicity and economy of concept and construction, efficiency and dependability of operation, and adaptability for use in a wide variety of applications.

Figure 3:
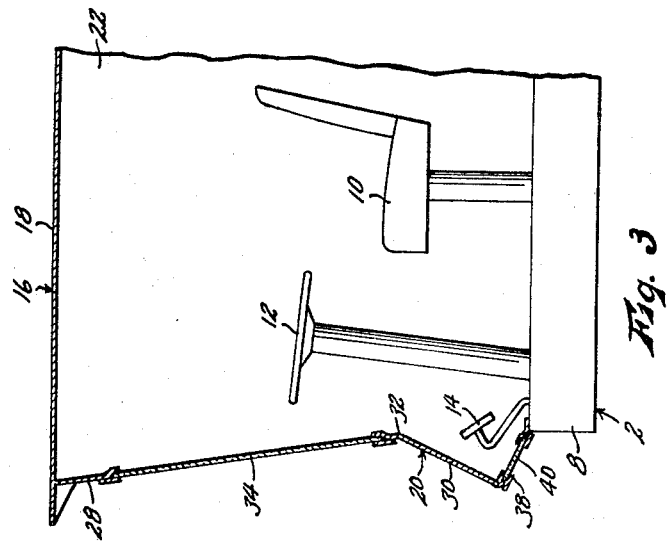
Figure 2:
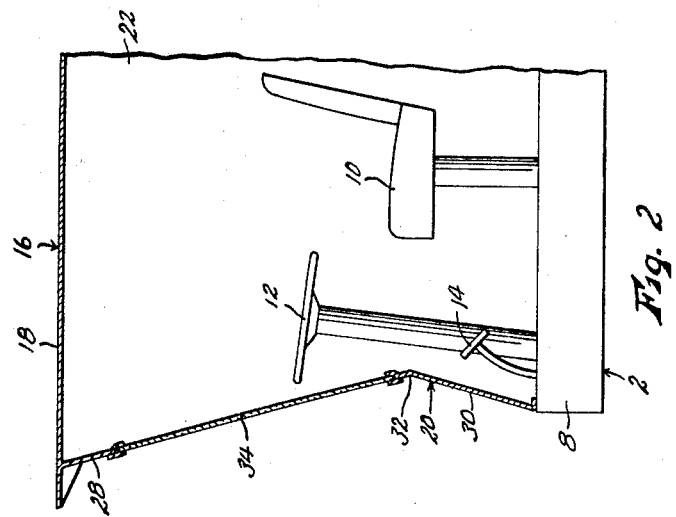

With these objects in view, as well as other objects which will appear in the course of the specification, reference will be had to the accompanying drawings, wherein:

FIG. 1 is a front perspective view of a harvester combine, having a cab enclosure embodying the present invention mounted thereon, FIG. 2 is an enlarged fragmentary sectional view taken on line II—II of FIG. 1, with parts left in elevation, and FIG. 3 is a view similar to FIG. 2, but showng a slight modification of structure.

Like reference numerals apply to similar parts throughout the several views, and the numeral 2 applies generally to a harvester combine of usual construction, the details thereof being well understood in the art and not pertinent to the present invention, and hence not here shown or described in detail. It is provided at its forward end with the usual transverse cutter bar assembly 4 and reel 6, these and closely related assemblies being those parts which the operator must be able to keep in view to assist him in efficient operation of the combine. The operator's station is on a platform 8 provided by the combine frame above and behind the cutter bar, reel and related assemblies, there being provided on said platform a seat 10 for the operator, a steering wheel 12, and one or more foot pedals 14 used by the operator in controlling the combine. The operator is seated as closely as practical to the forward end of the platform in order that he may, when seated, look as nearly vertically downwardly as possible to view important elements of the combine during operation. It has become common practice to place a cab enclosure on platform 8 to house the operator to provide more healthful and comfortable conditions, by protecting him from the weather and from the excessive dust often present. Such cabs usually are ventilated with filtered air, and sometimes equipped with air conditioners, although these features form no part of the present invention.

The cab enclosure forming the subject matter of the present invention is indicated generally by the numeral 16, being supported on platform 8 and consisting of a roof 18, front wall 20, side walls 22, and rear wall 24, platform 8 forming the floor of the cab and completing the enclosure thereof. It will be understood that the side and rear walls are equipped with transparent windows for all-around visibility, and that one of the side walls is equipped with an access door 26, but this also is not pertinent to the present invention. The sole feature for which patent protection is sought is the arrangement and configuration of front wall 20 of the cab, in other words the "profile" of the cab.

Said front wall 20 consists of an upper panel 28 and a lower panel 30, said panels being substantially planar and joined along a horizontal line 32 preferably somewhat below the knee level of the operator occupying seat 10, or about 15–18 inches above platform 8. Lower panel 30 is opaque, being formed preferably of sheet metal, and slopes downwardly and forwardly, so that the plane thereof lies substantially in a line of sight of the operator occupying seat 10. In FIGS. 1 and 2, the cab is so disposed that the lower edge of panel 30 is substantially flush with the forward edge of panel 8. Upper panel 28 slopes upwardly and forwardly from line 32, joining at its upper edge with roof 18. Panel 28 is fitted with a transparent window pane 34 of safety glass or the like. The width of said pane should be as nearly as practically possible the full width of panel 28, in order to provide a maximum horizontal field of vision for the operator. The lower edge of pane 34 should be as close as practically possible to joinder line 32 of the panels, and the upper edge thereof should be above the operator's horizontal line of sight.

The functional advantages of the described arrangement and "profile" of front wall 28 are numerous. It will be seen that since the slope of pane 34 is about equal but opposite to that of panel 30, and since pane 34 is of much greater vertical height than panel 30, the upper edge portion of pane 34 is disposed further forward than even the lower edge of panel 30. This provides head room in the cab so that the operator may, if desired, lean forwardly and look vertically downwardly past the lower edge of panel 30, and past the forward edge of platform 8. This ability in some instances will permit the operator to operate the combine more efficiently by providing better downward vision. The downward and rearward slope of pane 34 moves it closer to the operator's eyes than would otherwise be possible, and also into a plane more nearly at right angles to the operator's normally downward line of sight. Both of these factors tend to reduce aberration and distortion of light passing therethrough to the operator's eyes, thereby reducing eyestrain. The downwardly facing slope of the exterior surface of pane 34 also tends to reflect much of the sunlight impinging thereon downwardly, rather than transmitting or reflecting it to the operator's eyes. Also, the downwardly facing slope of the exterior surface of pane 34 tends to prevent dirt, dust, moisture and other matter from adhering thereto, so that it requires cleaning less often. The side "posts" 36 of panel 28 at the sides of pane 34 (see FIG. 1) are moved substantially rearwardly by the arrangement shown, particularly those portions of said posts adjacent the lower portion of pane 34, through which the operator normally looks. This increases the angle of unobstructed horizontal vision. Lower panel 30 is of course opaque whereby to provide cooling shade for the operator's legs and feet, but does not despite its opacity, appreciably obstruct the operator's downward vision since it is inclined to lie substantially in a plane intersecting the normal position of the operator's eyes. In this connection, it may be noted that the operator normally leans slightly forwardly in seat 10 when operating machines of this type. The operator simply looks through the lower edge portion of pane 34, along a line parallel to and closely adjacent the outer surface of panel 30. Panel 30 cannot extend vertically downwardly from line 32, since then it would inhibit and obstruct the foot room necessary for operation of foot pedals 14, which are usually positioned quite close to the forward edge of platform 8. While the vertical height of panel 30 is not particularly critical, a height of about 15–18 inches, or somewhat below the knee level of the operator, has been found advantageous for various reasons. If said panel were shorter, it would not shade the operator's feet and lower legs adequately. If it were substantially taller, it could contact the operator's knees and inhibit his leg movements to operate the foot pedals, bearing in mind that slope thereof must be in plane intersecting the normal position of the operator's eyes. Also, making panel 30 taller would shift the lower edge of upper panel 28 rearwardly, so that window pane 34 would engage or come too closely adjacent steering wheel 12. A good operating clearance therebetween must be maintained.

FIG. 3 shows a modification of front wall 20 adapted for use with certain models of combines in which foot pedals 14 are so arranged that they actually project forwardly from the forward edge of platform 8, at least when depressed. The pedal 14 in FIG. 3 is shown in a depressed or partially depressed position. Since the pedal must of course be enclosed in the cab, it is obvious that the cab must be extended forwardly of the platform in this region. For this purpose, panel 30 is shifted forwardly to the required degree, the upward and rearward slope thereof being shifted slightly toward the horizontal so that its plane still lies in the line of sight of the operator. A third panel 38 is secured at its forward edge to the lower edge of panel 30, and its rearward edge engages the forward edge of platform 8. Said panel of course extends the entire width of the cab, and insofar as practically possible the entire area thereof consists of a transparent pane 40 of safety glass or the like. This structure provides ample space interiorly of the cab for the operation of the foot pedals. If the operator desires to look downwardly past the edge of platform 8, he simply looks through pane 40 rather than pane 34.

While we have shown and described certain specific embodiments of our invention, it will be readily apparent that many minor changes of structure and operation could be made without departing from the spirit of the invention as defined by the scope of the appended claims.

What we claim as new and desire to protect by Letters Patent is:

1. A cab enclosure for the operator of a harvester combine or the like having a platform for said operator disposed above and behind primary operating elements of said harvester which said operator must keep in view, said cab enclosure having a front wall including:
    (a) a generally planar upper panel and
    (b) a generally planar lower panel joined to said upper panel along a horizontal line, said upper panel sloping upwardly and forwardly from said joinder line and having a transparent window therein the lower edge of which is closely adjacent said joinder line, and said lower panel being inclined downwardly and forwardly from said joinder line, being opaque, and extending downwardly approximately to the level of said platform.

2. A cab enclosure as recited in claim 1 wherein said lower front wall panel is disposed in a plane including the normal position of the eyes of an operator in said cab.

3. A cab enclosure as recited in claim 1 wherein the upper edge portion of the transparent window of said upper panel is disposed forwardly of the lower edge of said lower panel.

4. A cab enclosure as recited in claim 1 wherein said lower front wall panel is disposed in a plane including the normal position of the eyes of an operator in said cab, and wherein the upper edge portion of the transparent window of said upper panel is disposed forwardly of the lower edge of said lower panel.

5. A cab enclosure as recited in claim 1 wherein the upper edge of said lower panel is disposed somewhat below the normal knee-level of an operator riding in said cab.

6. A cab enclosure as recited in claim 1 wherein the upper edge of said lower panel is disposed somewhat below the normal knee-level of an operator riding in said cab, and wherein said lower panel is disposed in a plane including the normal position of the eyes of said operator.

7. A cab enclosure as recited in claim 6 wherein the upper edge of said lower panel is disposed about 15 to 18 inches above the floor level of said cab.

8. A cab enclosure as recited in claim 2 wherein the lower edge of said lower panel is disposed substantially coincident with the forward edge of said platform.

9. A cab enclosure as recited in claim 2 wherein the lower edge of said lower panel is spaced forwardly of the forward edge of said platform, and with the addition of:
    (a) a third front wall panel secured at its forward edge to the lower edge of said lower panel and extending rearwardly to the forward edge of said platform, said third panel having a transparent window therein.

References Cited by the Examiner

UNITED STATES PATENTS

D. 176,624    1/1956    McIntosh.
2,997,333    8/1961    Kauffman et al. _____ 296—28

OTHER REFERENCES

Publication: "Massey-Furguson Combines MF410, MF510," Illustration, "Climate Conditioned Cabs" on inside page of back cover, received May 22, 1964.

BENJAMIN HERSH, *Primary Examiner.*

E. E. PORTER, *Assistant Examiner.*